(12) United States Patent
Hasegawa et al.

(10) Patent No.: US 12,509,019 B2
(45) Date of Patent: Dec. 30, 2025

(54) CONTROL DEVICE FOR VEHICLE, CONTROL METHOD, AND STORAGE MEDIUM

(71) Applicant: HONDA MOTOR CO., LTD., Tokyo (JP)

(72) Inventors: Kazune Hasegawa, Tokyo (JP); Kazumu Suzuki, Tokyo (JP); Kai Motoyama, Tokyo (JP); Shota Hoshaku, Tokyo (JP); Tomoaki Masakawa, Tokyo (JP); Taira Ikedagaki, Tokyo (JP); Tadahiko Kanoh, Tokyo (JP); Kenji Sugiyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 18/440,234

(22) Filed: Feb. 13, 2024

(65) Prior Publication Data

US 2024/0326735 A1    Oct. 3, 2024

(30) Foreign Application Priority Data

Mar. 31, 2023  (JP) ................................ 2023-059055

(51) Int. Cl.
  *B60R 25/01* (2013.01)
  *G07C 9/00* (2020.01)
(52) U.S. Cl.
  CPC .................................. *B60R 25/01* (2013.01)
(58) Field of Classification Search
  CPC ......... B60R 25/01; G07C 9/00; H04W 4/029; H04W 4/44
  See application file for complete search history.

(56) References Cited

U.S. PATENT DOCUMENTS

| 10,723,359 | B2 | 7/2020 | Thompson et al. |
| 11,077,864 | B2 | 8/2021 | Ishisaka et al. |
| 11,637,832 | B2 | 4/2023 | Han |
| 2019/0283774 | A1* | 9/2019 | Ishisaka ............ B60W 60/0051 |

(Continued)

FOREIGN PATENT DOCUMENTS

| JP | 2019-156171 A | 9/2019 |
| JP | 2021-194975 A | 12/2021 |
| JP | 2022-140011 A | 9/2022 |

OTHER PUBLICATIONS

Japanese Office Action for Japanese Patent Application No. 2023059055 mailed Jan. 6, 2025.

*Primary Examiner* — Tan Q Nguyen
(74) *Attorney, Agent, or Firm* — Thomas| Horstemeyer, LLP

(57) ABSTRACT

A control device for a vehicle includes a reception unit configured to receive, from a server, first authority information indicating whether a user of the vehicle has an authority to use a specific vehicle control function, an update unit configured to update, based on the first authority information, second authority information that indicates whether the user has the authority to use the specific vehicle control function and is stored in a storage device of the vehicle, and a vehicle control unit configured to perform the vehicle control function based at least in part on the second authority information indicating that the user has the authority to use the specific vehicle control function.

6 Claims, 4 Drawing Sheets

(56) References Cited

U.S. PATENT DOCUMENTS

2019/0315369 A1   10/2019  Thompson et al.
2020/0322337 A1   10/2020  Han
2022/0291648 A1    9/2022  Sekino et al.
2022/0417246 A1*  12/2022  Zhang .................. H04L 63/102
2024/0112512 A1*   4/2024  Suzuki ............... G07C 9/00309

* cited by examiner

CONTROL DEVICE FOR VEHICLE, CONTROL METHOD, AND STORAGE MEDIUM

CROSS-REFERENCE TO RELATED APPLICATION(S)

This application claims priority to and the benefit of Japanese Patent Application No. 2023-059055, filed Mar. 31, 2023, the entire disclosure of which is incorporated herein by reference.

BACKGROUND OF THE INVENTION

Field of the Invention

The present invention relates to a control device for a vehicle, a control method, and a storage medium.

Description of the Related Art

In recent years, more initiatives are being made to provide access to sustainable transportation systems in consideration of vulnerable traffic participants. In order to realize this goal, research and development related to driving assistance technologies for further improving transportation safety and convenience have been focused on. Business models that only allow particular functions of vehicles to be performed if a user has a use authority are known. Japanese Patent Laid-Open No. 2022-140011 describes a technology for enabling a function in a plurality of vehicles based on license data of a user. A configuration in which the server unitarily manages whether the user has an authority to use a specific vehicle control function is conceivable. In a configuration in which the vehicle constantly queries the server about the use authority, the vehicle cannot determine whether the user has the use authority, and the user cannot use the vehicle control function when the vehicle cannot access the server.

SUMMARY OF THE INVENTION

An aspect of the present application achieves a technology for improving convenience of a vehicle control function, and thus contributes to development of a sustainable transportation system. According to some embodiments, a control device for a vehicle, the control device comprising: a reception unit configured to receive, from a server, first authority information indicating whether a user of the vehicle has an authority to use a specific vehicle control function; an update unit configured to update, based on the first authority information, second authority information that indicates whether the user has the authority to use the specific vehicle control function and is stored in a storage device of the vehicle; and a vehicle control unit configured to perform the vehicle control function based at least in part on the second authority information indicating that the user has the authority to use the specific vehicle control function is provided.

DESCRIPTION OF THE EMBODIMENTS

Figure 1:
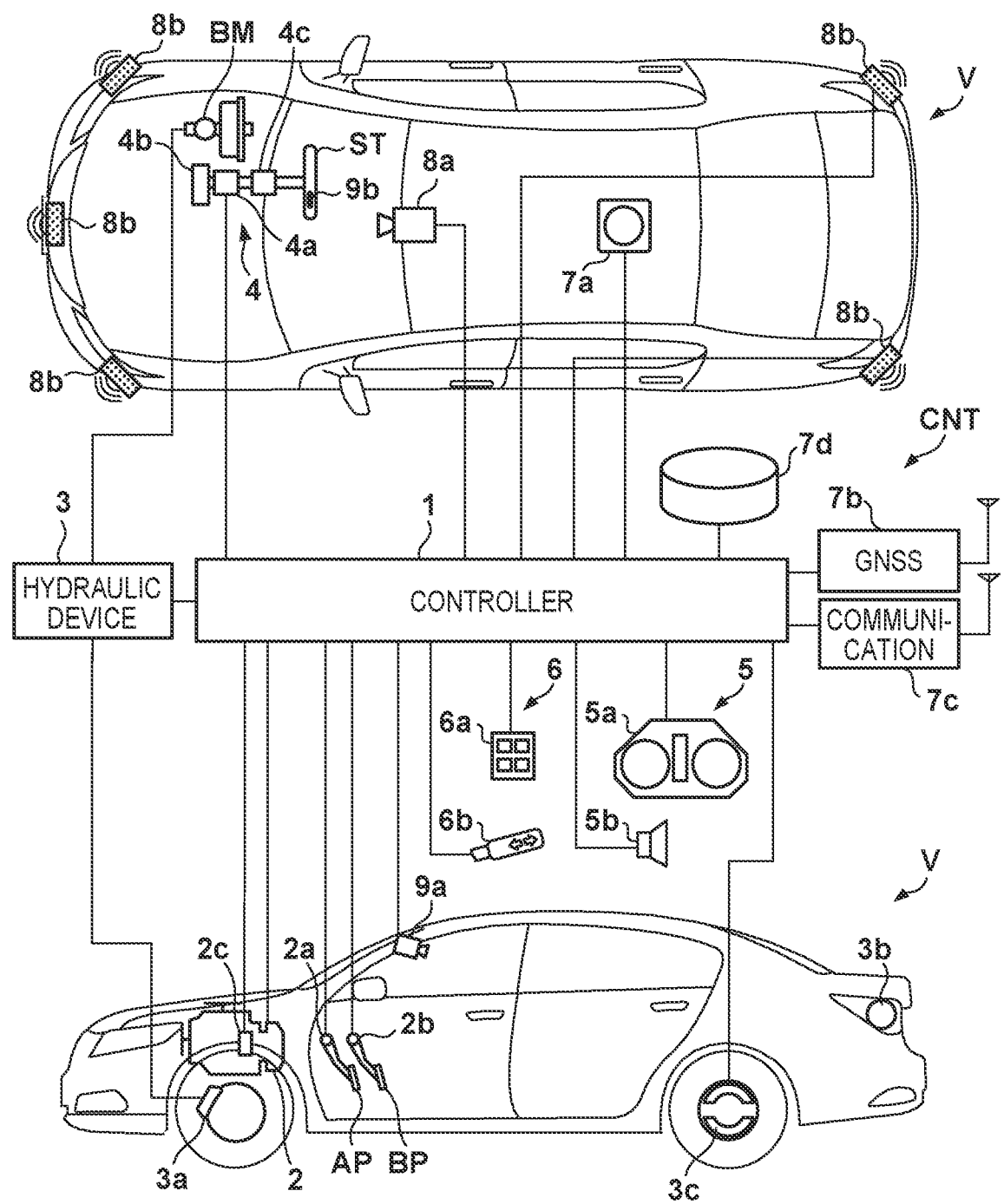
FIG. 1 is a block diagram illustrating a configuration example of a vehicle according to some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram illustrating a control device CNT according to an embodiment of the present invention and also a schematic diagram illustrating a vehicle V which is an application example of the control device CNT. FIG. 1 is a top and side view schematically illustrating the vehicle V. The vehicle V according to the present embodiment is, for example, a sedan type four-wheeled passenger vehicle and may be, for example, a parallel hybrid vehicle. The vehicle V is not limited to a four-wheeled passenger vehicle, and may be a straddled vehicle (a two-wheeled motorcycle or a three-wheeled motorcycle) or a large vehicle such as a truck or a bus.

The control device CNT includes a controller 1 that is an electronic circuit that performs control of the vehicle V including driving assistance of the vehicle V. The controller 1 includes a plurality of electronic control units (ECUs). An ECU is provided for each function of the control device CNT, for example. Each ECU includes a processor represented by a central processing unit (CPU), a storage device such as a semiconductor memory, and an interface with an external device. The storage device stores a program to be executed by the processor, data used for processing by the processor, and the like. The interface includes an input/output interface and a communication interface. Each ECU may include a plurality of processors, a plurality of storage devices, and a plurality of interfaces. A program to be stored in the storage device may be installed in the control device CNT via a storage medium, such as a CD-ROM, to be stored in the storage device. In addition to or instead of this, the program stored in the storage device may be downloaded from an external server via wireless communication.

The controller 1 controls driving (acceleration) of the vehicle V by controlling a power unit (power plant) 2. The power unit 2 is a travel driving unit that outputs a driving force for rotating driving wheels of the vehicle V and can include an internal combustion engine, a motor, and an automatic transmission. The motor can be used as a drive source that accelerates the vehicle V, and can also be used as a generator at the time of deceleration or the like (regenerative braking).

In the case of the present embodiment, the controller 1 controls an output of the internal combustion engine or the motor or switches a gear position of the automatic transmission in accordance with a driver's driving operation detected by an operation detection sensor 2a provided on an accelerator pedal AP or an operation detection sensor 2b provided on a brake pedal BP, a vehicle speed of the vehicle V detected by a rotation speed sensor 2c, or the like. The automatic transmission includes a rotation speed sensor 2c that detects a rotation speed of an output shaft of the automatic transmission as a sensor that detects a traveling state of the vehicle V. The vehicle speed of the vehicle V can be calculated from a result of detection by the rotation speed sensor 2c.

The controller 1 controls braking (deceleration) of the vehicle V by controlling a hydraulic device 3. A driver's braking operation on the brake pedal BP is converted into a hydraulic pressure in a brake master cylinder BM to be transmitted to the hydraulic device 3. The hydraulic device 3 is an actuator capable of controlling a hydraulic pressure of a hydraulic oil supplied to a brake device 3a (for example, a disc brake device) provided on each of the four wheels, based on the hydraulic pressure transmitted from the brake master cylinder BM.

The controller 1 can control braking of the vehicle V by performing drive control of an electromagnetic valve or the like included in the hydraulic device 3. The controller 1 can also configure an electric servo brake system by controlling distribution of a braking force by the brake device 3a and a braking force by regenerative braking of the motor included in the power unit 2. The controller 1 may turn on a brake lamp 3b at the time of braking.

The controller 1 controls steering of the vehicle V by controlling an electric power steering device 4. The electric power steering device 4 includes a mechanism that steers the front wheels in response to a driver's drive operation (steering operation) on a steering wheel ST. The electric power steering device 4 includes a drive unit 4a that generates a driving force (sometimes referred to as a steering assist torque) for assistance with the steering operation or automatic steering of the front wheels of the vehicle V. The drive unit 4a includes a motor as a drive source. The electric power steering device 4 further includes a steering angle sensor 4b that detects a steering angle and a torque sensor 4c that detects a steering torque taken on by the driver (referred to as a steering load torque and distinguished from the steering assist torque).

The controller 1 controls electric parking brake devices 3c provided in the rear wheels of the vehicle V. The electric parking brake device 3c includes a mechanism that locks the rear wheels. The controller 1 can control locking and unlocking of the rear wheels by the electric parking brake device 3c.

The controller 1 controls an information output device 5 that reports information inside the vehicle. The information output device 5 includes, for example, a display device 5a that notifies the driver of information by an image and/or a voice output device 5b that notifies the driver of information by sound. Examples of the display device 5a include a display device provided in an instrument panel; and a display device provided in the steering wheel ST. In this case, the display device 5a may include a head-up display. The information output device 5 may notify an occupant of information by vibration or light.

The controller 1 receives an instruction input by an occupant (for example, a driver) via an input device 6. The input device 6 is disposed at a position at which the input device 6 can be operated by the driver and includes, for example, a switch group 6a used for the driver to give an instruction to the vehicle V and/or a direction indicator lever 6b for operating a direction indicator (blinker).

The controller 1 recognizes and determines a present position and a route (attitude) of the vehicle V. In the case of the present embodiment, the vehicle V includes a gyro sensor 7a, a global navigation satellite system (GNSS) sensor 7b, and a communication device 7c. The gyro sensor 7a detects a rotational motion (yaw rate) of the vehicle V.

The GNSS sensor 7b detects a present position of the vehicle V. The communication device 7c performs wireless communication with a server that provides map information and traffic information, and acquires such information. In the case of the present embodiment, the controller 1 determines a route of the vehicle V based on detection results of the gyro sensor 7a and the GNSS sensor 7b, sequentially acquires map information regarding the route from the server via the communication device 7c, and stores the map information in the database 7d (storage device). The vehicle V may include another sensor that detects a state of the vehicle V, such as an acceleration sensor that detects an acceleration of the vehicle V.

The controller 1 assists with driving of the vehicle V based on detection results of various detection units provided in the vehicle V. The vehicle V includes: a plurality of surrounding detection units 8a and 8b serving as external sensors that detect a situation outside of (or a surrounding situation of) the vehicle V and a plurality of in-vehicle detection units 9a and 9b serving as in-vehicle sensors that detects a state inside the vehicle (a state of an occupant, particularly the driver). The controller 1 can ascertain a surrounding situation of the vehicle V, based on detection results of the surrounding detection units 8a and 8b and then assist with driving the vehicle V in accordance with this surrounding situation. The controller 1 can determine whether the driver is performing a predetermined operation obligation imposed on the driver when performing driving assistance based on the detection results of the in-vehicle detection units 9a to 9b.

The surrounding detection unit 8a is an imaging device that captures an image in front of the vehicle V (hereinafter also referred to as a front camera 8a), and is mounted in the vehicle interior of the windshield at the front of the roof of the vehicle V, for example. The controller 1 can extract a contour of a target or a lane mark line (such as a white line) on a road by analyzing the image captured by front camera 8a.

The surrounding detection unit 8b is a millimeter wave radar (hereinafter also referred to as the radar 8b), detects a target around the vehicle V using radio waves, and detects (measures) a distance to the target and a direction (azimuth) of the target with respect to the vehicle V. In the example illustrated in FIG. 1, five radars 8b are provided. One radar is provided in the middle of the front part of the vehicle V, one radar is provided at each of the right and left corner portions of the front part of the vehicle V, and one radar is provided at each of the right and left corner portions of the rear part of the vehicle V.

The surrounding detection unit provided in the vehicle V is not limited to the above configuration. The number of cameras and the number of radars may be changed, or a light detection and ranging (LiDAR) senor that detects a target around the vehicle V may be provided.

The in-vehicle detection unit 9a is an imaging device that captures an image inside the vehicle (hereinafter also referred to as an in-vehicle camera 9a) and is mounted on, for example, the vehicle interior at the front part of the roof of the vehicle interior V. In the case of the present embodiment, the in-vehicle camera 9a is a driver monitor camera that captures an image of the driver (for example, the eyes and the face of the driver). The controller 1 can determine a direction of the line of sight and the face of the driver by analyzing an image (a face image of the driver) captured by the in-vehicle camera 9a.

The in-vehicle detection unit 9b is a gripping sensor (hereinafter also referred to as the gripping sensor 9b) that detects gripping of the steering wheel ST by the driver and is provided in, for example, at least a part of the steering wheel ST. As the in-vehicle detection unit, the torque sensor 4c that detects a steering torque of the driver may be used.

Examples of driving assistance for the vehicle V provided for the driver include acceleration/deceleration assist, lane keeping assist, and lane change assistance. The acceleration/deceleration assist is driving assistance (adaptive cruise control (ACC)) in which the controller 1 automatically controls the acceleration/deceleration of the vehicle V within a predetermined vehicle speed by automatically controlling the power unit 2 and the hydraulic device 3 based on a detection result of the surrounding detection unit 8 and the map information. When there is a preceding vehicle, acceleration/deceleration of the vehicle V can also be performed in the ACC so that a distance between the vehicle V and the preceding vehicle is kept constant. The ACC reduces a burden on the driver which may be involved in her or his acceleration/deceleration operation (an operation on the accelerator pedal AP or the brake pedal BP).

The lane keeping assist is driving assistance (lane keeping assist system (LKAS)) in which the controller 1 automatically controls the electric power steering device 4 based on the map information and the detection results of the surrounding detection units 8 so that the vehicle V keeps running within the lane. The LKAS reduces a burden on the driver which may be involved in a steering operation (an operation on the steering wheel ST) while the vehicle V is running straightly.

The lane change assistance is driving assistance (auto lane changing (ALC) or active lane change assist (ALCA)) in which the controller 1 automatically controls the power unit 2, the hydraulic device 3, and the electric power steering device 4 based on detection result of the surrounding detection units 8 and the map information to automatically change a traveling lane of the vehicle V to an adjacent lane. The ALC is the lane change assistance based on a system request, and the ALCA is the lane change assistance based on an occupant request. Examples of the system request include a case in which a navigation system performing route guidance of the vehicle V to a destination makes a request for changing a lane of the vehicle V and a case in which the vehicle V attempts to pass a preceding vehicle independently of the route guidance. When an occupant makes a request for changing a lane, the driver gives an instruction to change a lane by operating an input device (for example, the direction indicator lever 6b). The ALC or the ACLA reduces a burden on the driver who performs an acceleration or deceleration operation or a steering operation of the vehicle V during the change in the lane.

Other examples of the driving assistance control may include, for example, a collision reduction brake that assists collision avoidance with a target (for example, a pedestrian, another vehicle, or an obstacle) on a road by controlling the hydraulic device 3, an ABS function, traction control, and/or posture control of the vehicle V.

In some embodiments, the controller 1 selectively performs one of the three modes 1 to 3 having different driving assistance content. The mode may be referred to as a state. Hereinafter, a case where the ACC, the LKAS, the ALC, or the ACLA is provided as the driving assistance will be described. The driving assistance content of each of modes 1 to 3 is not limited to the ACC, the LKAS, the ALC, or the ACLA and may include other driving assistance content. Only one of the ALC and the ACLA may be applied.

Mode 1 is a manual drive mode in which none of the ACC, the LKAS, the ALC, and the ACLA is performed and is thus based on a manual drive operation of the driver. This mode is first set when the vehicle V starts up.

Both mode 2 and mode 3 are set under the condition that the occupant requests the driving assistance when the vehicle V is in mode 1. Mode 2 is a regular assist mode in which both ACC and LKAS are executable. In mode 2, neither the ALC nor the ACLA is performed.

Mode 3 is an extended assist mode in which all the ACC, the LKAS, the ALC, and the ACLA can be performed. The extended assist mode may also be referred to as an advanced highway driving (AHD) mode. Mode 3 is set under the condition that the controller 1 has acquired high-precision map information that includes information regarding a road (traveling road) on which the vehicle V is traveling. The high-precision map information includes more precise road information than map information (sometimes referred to as regular map information) used for route guidance to a destination. Specifically, the high-precision map information may include at least positional information in the lane. This can be used to control a position of the vehicle V in the vehicle width direction. The high-precision map information may further include information regarding a detailed shape of the road, such as presence or absence of a curve, a curvature, an increase or decrease of a lane, and a gradient. The high-precision map information is prepared, for example, for each district or each section of roads. There can be some districts and sections of roads for which the high-precision map information may be unavailable.

In mode 3, the above high-precision map information can be used to perform the lane change assistance (ALC or ACLA). Positional information within a lane included in the high-precision map information and current location of the vehicle V detected by the GNSS sensor 7b can be utilized and highly reliable and smooth lane change assistance can be performed while other vehicles around the vehicle V are recognized from the externality detection results of the detection units 8a and 8b. The lane change assistance may be performed without using the high-precision map information.

In each of mode 2 and mode 3, both the ACC and the LKAS can be performed. More specifically, in mode 3, the ACC and the LKAS using the high-precision map information can be performed. The controller 1 can accelerate or decelerate the vehicle V and control a position of the vehicle V in a horizontal direction by acquiring, in advance, information regarding a road on which the vehicle will run from the high-precision map information. The highly reliable and smooth ACC and LKAS can be further provided to the occupant.

The vehicle control function such as a driving assistance function regarding the above-described modes 2 and 3 may be executable by a provider of the vehicle control function (for example, the manufacturer of the vehicle V) adding an authority to use the vehicle control function to the user of the vehicle V. The user of the vehicle V may be called an occupant of the vehicle V when the user is boarding the vehicle V. The user of the vehicle V can be called a driver of the vehicle V when the user is driving the vehicle V. In the following description, the user of the vehicle V is simply referred to as a user. The authority to use the vehicle control function may be given, for example, by the user making a contract with a provider of the vehicle control function after the user starts to use the vehicle V. A configuration example of a function providing system 200 that provides a vehicle control function of requiring a use authority will be described with reference to FIG. 2.

Figure 2:
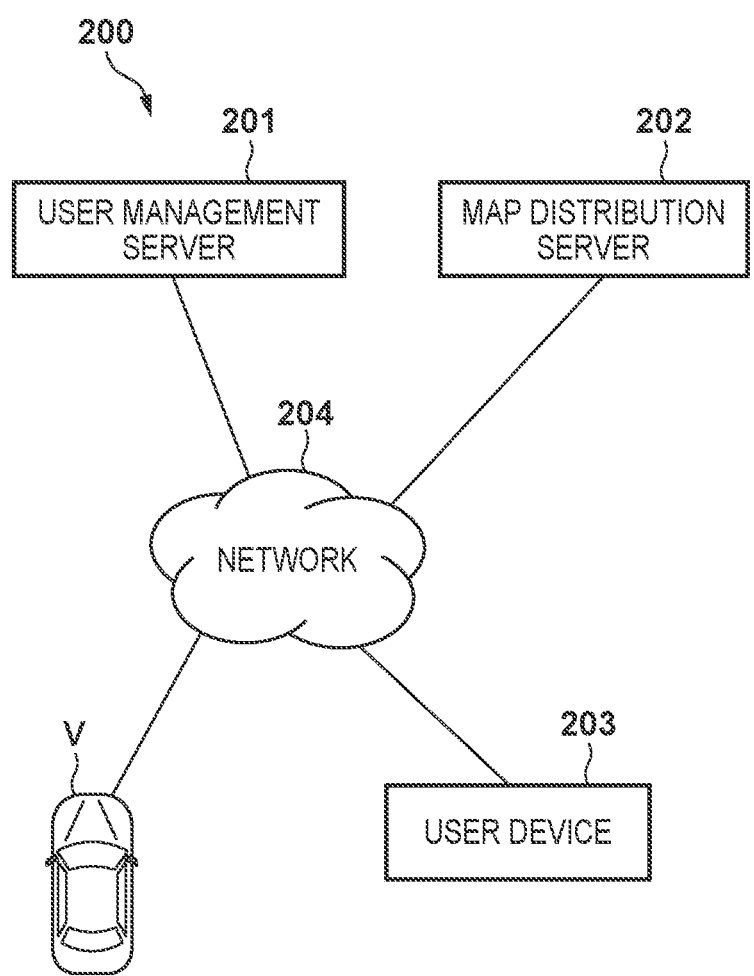
FIG. 2 is a block diagram illustrating a configuration example of a function providing system according to some embodiments.

The function providing system 200 may include, for example, the vehicle V, a user management server 201, a map distribution server 202, and a user device 203. Only one vehicle V is illustrated in the example of FIG. 2, but the function providing system 200 may include a plurality of vehicles. Similarly, the function providing system 200 may include a plurality of user devices 203. The vehicle V, the user management server 201, the map distribution server 202, and the user device 203 may be able to communicate with each other via the network 204. The network 204 may include a local area network (LAN), a wide area network (WAN), the Internet, a cellular network, or any combination thereof. Communication between the vehicle V and the network 204 is typically wireless communication.

The user management server 201 manages information regarding the user. For example, the user management server 201 may give the user the authority to use the vehicle control function in response to a request from the user. The request for giving the use authority may be made by the user using the user device 203. The user device 203 is a device that is used by a user and may be, for example, a personal computer, a mobile phone, a smartphone, a tablet computer, or the like. The request for giving the use authority may be made by the user using the vehicle V.

The request for giving the use authority may include user account information and identification information of a target vehicle (for example, the vehicle V) that enables execution of the vehicle control function. The user account information is information used for the user management server 201 to uniquely identify the user. The identification information of the vehicle may be a vehicle identification number (VIN). The request for giving the use authority may include a designation of a type of vehicle control function to which the use authority is given. The vehicle control function to which the use authority is given may be the above-described entire AHD, may be some of the functions (for example, the ALC or the ALCA), may be another driving assistance function, or may be a function other than the driving assistance function.

The user management server 201 gives the user the authority to use the vehicle control function designated by the user to a vehicle (for example, the vehicle V) designated by the user in response to a request from the user. The use authority may be given for a fee or may be given for free. The user management server 201 may set an expiration date in the use authority. If the expiration date has expired, the use authority will be canceled. The user may be able to extend the expiration date by updating the use authority before the expiration date expires. For each user of a management target, the user management server 201 may store user account information, vehicle identification information, a vehicle control function for which the user has the use authority, and an expiration date of the use authority (when the expiration date is set) in association.

The vehicle V (specifically, the controller 1 and the same applies below) may inquire to the server about whether the user has an authority to use the specific vehicle control function. The inquiry may include account information of the user and identification information of the vehicle V. In response to reception of the inquiry including the account information of the user and the identification information of the vehicle V, the user management server 201 determines whether the user has the use authority associated with these pieces of information with reference to the user information managed by the user management server itself. When the user has the use authority, the user management server 201 transmits information indicating the vehicle control function for which the user has the use authority to the vehicle V. When an expiration date is set in the use authority, the user management server 201 also transmits the expiration date to the vehicle V. When the user does not have the use authority, the user management server 201 may transmit, to the vehicle V, information indicating that there is no vehicle control function for which the user has the use authority. In this way, the vehicle V acquires, from the user management server 201, the information indicating whether the user has the authority to use a specific vehicle control function and an expiration date if the expiration date is set. The vehicle V may store the information and use the information for a subsequent process.

The vehicle V may transmit information indicating a state of the vehicle V to the user management server 201. The information indicating the state of the vehicle V may include, for example, information on a failure occurring in the vehicle V. The user management server 201 may notify the user device 203 using information indicating the state of the vehicle V. For example, when information indicating that a failure has occurred in the vehicle Vis received from the vehicle V, the user management server 201 may notify the user device 203 of the information.

The map distribution server 202 is an example of a server that provides information used for the vehicle V to perform a specific vehicle control function. The map distribution server 202 may provide map information (for example, the high-precision map information as described above) as the information. The map distribution server 202 may provide the map information to the vehicle V at least based on the fact that the user has the authority to use the map information.

For example, in order to acquire the map information from the map distribution server 202, the vehicle V may transmit information indicating that the user has the authority to use the map information to the map distribution server 202. This information may be a token provided by the user management server 201. When it is determined that the user has the authority to use the map information, the map distribution server 202 may transmit the map information to the vehicle V.

An example of a method used for the controller 1 of the vehicle V to start execution of a specific vehicle control function will be described with reference to FIG. 3. Each step of the method of FIG. 3 may be performed by a processor of the controller 1 performing a program stored in a memory of the controller 1. Instead of this, some or all of the steps of the method of FIG. 3 may be performed by a dedicated integrated circuit, such as an application specific integrated circuit (ASIC).

Figure 3:
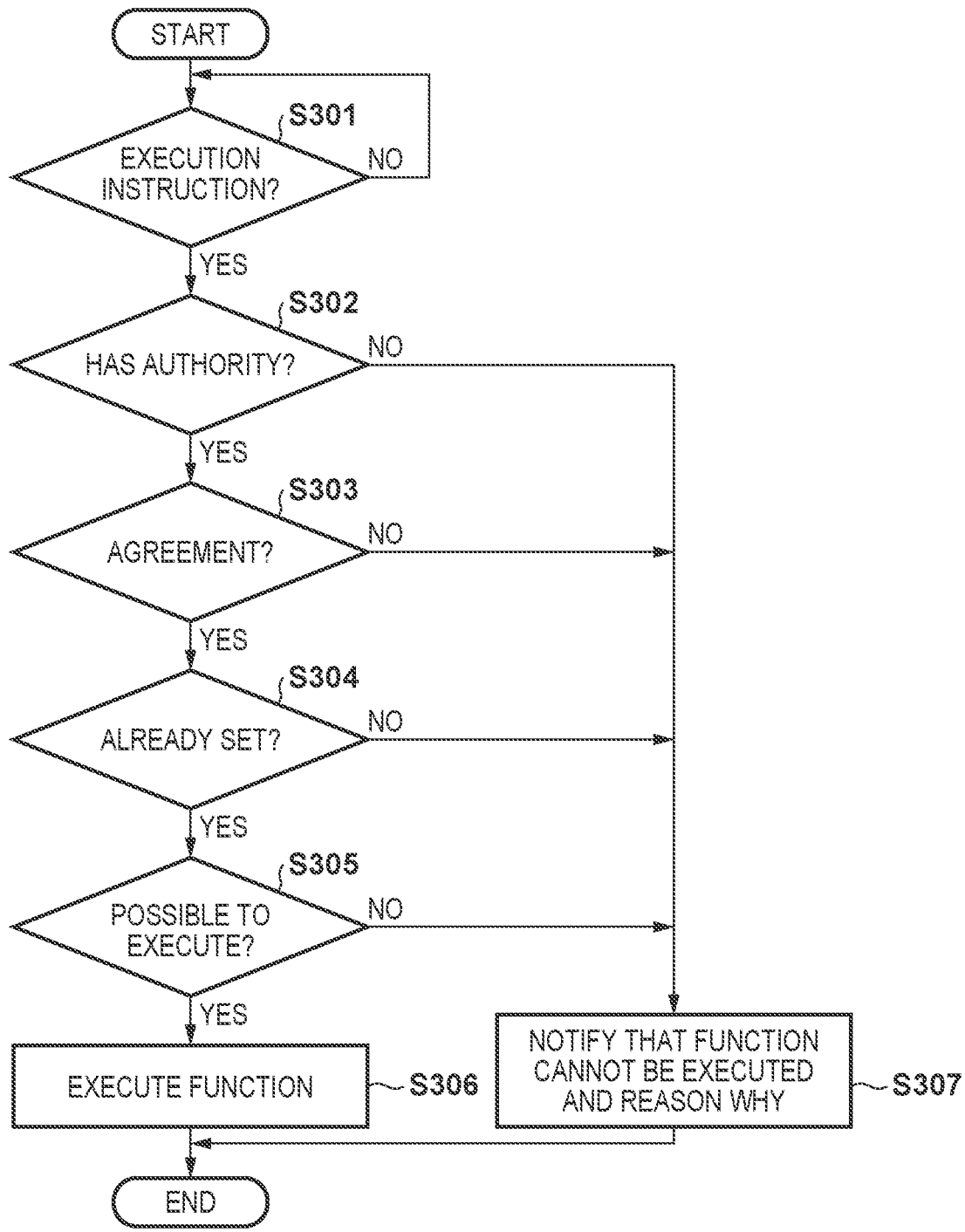
FIG. 3 is a flowchart illustrating an operation example of a vehicle according to some embodiments.

The method of FIG. 3 may be started in response to power-on of the power source (for example, an ignition power supply) of the vehicle V. Further, the method of FIG. 3 may be started in response to the user logging into the vehicle V using her or his account information. For example, the user may input her or his account information to the input device 6. The controller 1 may determine whether the account information input by the user matches the account information registered in the vehicle V. When the account information matches each other, the controller 1 may use the matched account information to perform a subsequent process. Accordingly, the vehicle control function can be inhibited from being performed when a person other than the user having the use authority uses the vehicle V.

In step S301, the controller 1 determines whether an instruction to perform a specific vehicle control function has been received from the user. When it is determined that an instruction to perform the specific vehicle control function has been received from the user ("YES" in S301), the controller 1 moves the process to S302, and repeats S301 in the other cases ("NO" in S301). In this way, the controller 1 waits for an instruction to perform the specific vehicle control function. The specific vehicle control function may be, for example, a driving assistance function of the vehicle V and may be, for example, the ACC, the LKAS, the ALC, the ACLA, or a combination thereof, as described above.

In step S302, the controller 1 determines whether the user has the authority to use the instructed vehicle control function. When it is determined that the user has authority to use the instructed vehicle control function ("YES" in S302), the controller 1 moves the process to S303. Otherwise ("NO" in S302), the controller 1 moves the process to S307. When it is determined that the user does not have the authority to use the instructed vehicle control function, the controller 1 notifies the user that the instructed vehicle control function cannot be performed in S307. Further, the controller 1 may notify the user that the user has no authority. In this case, the controller 1 may guide the user to a method of acquiring the authority (for example, a method of applying for a use contract).

The controller 1 may acquire information indicating whether the user has the authority to use a specific vehicle control function from the user management server 201 before S301 is performed, and may store the information in the memory of the controller 1. For example, the controller 1 may transmit an inquiry about whether the user has the authority to use the specific vehicle control function to the user management server 201 in response to turn-on of the ignition power source of the vehicle V. The controller 1 may determine that the user does not have the use authority when the expiration date of the use authority has expired. The program realizing the specific vehicle control function may be stored in the vehicle V in advance (for example, when the vehicle V is manufactured) or may be downloaded to the vehicle V after the user is given the authority to use this function.

In S303, the controller 1 determines whether the user agrees that the controller 1 uses personal information. When it is determined that the user agrees to use the personal information ("YES" in S303), the controller 1 moves the process to S304. Otherwise ("NO" in S303), the controller 1 moves the process to S307. When it has not been confirmed that the user agrees to use the personal information, the controller 1 notifies the user that the instructed vehicle control function cannot be performed in S307. Further, the controller 1 may notify the user that it has not been confirmed that the user agrees to use the personal information. In this case, the controller 1 may guide the user how to agree to use the personal information (for example, a screen used to agree to use the personal information may be presented to the user).

The agreement with the use of the personal information may be made to the vehicle V, and the controller 1 may store the agreement in the memory and use it for subsequent processing. Instead of or in addition to this, the agreement with the use of the personal information may be made to the user management server 201 through the user device 203. The controller 1 may acquire information indicating that the user agrees to use the personal information from the user management server 201 and store the information in the memory for a subsequent process.

Depending on content of the vehicle control function, the personal information of the user is used. For example, when the above-described high-precision map information is used, a present position of the vehicle V is provided to the map distribution server 202. Since the present position of the vehicle V matches the present position of the user, the present position may correspond to the personal information. An image of the user captured by the in-vehicle camera 9a may also correspond to the personal information. In order to use such personal information, the agreement of the user may be required by law in some countries. When the instructed vehicle control function does not use the personal information, S303 may be omitted. When the vehicle V is used in a country that does not have a law requiring agreement of the user to use the personal information, S303 may be omitted.

In S304, the controller 1 determines whether the user performs setting in advance so that the instructed vehicle control function can be performed. When it is determined that the user performs the setting in advance so that the instructed vehicle control function can be performed ("YES" in S304), the controller 1 moves the process to S305. Otherwise ("NO" in S304), the controller 1 moves the process to S307. When it is determined that the user does not perform the setting in advance so that the instructed vehicle control function can be performed, the controller 1 notifies the user in S307 that the instructed vehicle control function cannot be performed. Further, the controller 1 may notify the user that the user does not perform the setting in advance so that the instructed vehicle control function can be performed. In this case, the controller 1 may guide the user on a method of performing setting to enable the execution of the instructed vehicle control function (for example, a screen used to perform the setting to enable the execution of the instructed vehicle control function may be presented to the user).

Information indicating whether the setting is performed to enable the execution of the instructed vehicle control function may be stored in the memory of the controller 1 and the processor of the controller 1 may refer to this information. In S301, the user may unintentionally give an instruction to perform the specific vehicle control function (for example, a button for giving an instruction is erroneously touched). Accordingly, the controller 1 may set, as a prerequisite for performing the specific vehicle control function, that the user performs the setting to enable the execution of the specific vehicle control function in advance. When the prerequisite is unnecessary, S304 may be omitted.

In S305, the controller 1 determines whether the instructed vehicle control function can be performed. When it is determined that the instructed vehicle control function can be performed ("YES" in S305), the controller 1 moves the process to S306. Otherwise ("NO" in S305), the controller 1 moves the process to S307. When it is determined that the instructed vehicle control function cannot be performed, the controller 1 notifies the user that the instructed vehicle control function cannot be performed in S307. Further, the controller 1 may notify the user that the instructed vehicle control function is not in a performable state.

For example, when the instructed vehicle control function requires high-precision map information and the high-precision map information cannot be used, the controller 1 may determine that the function cannot be performed. When the instructed vehicle control function can be performed only in a specific travel environment (for example, a highway) and the vehicle V is not in such a travel environment, the controller 1 may determine that the function cannot be performed. If the instructed vehicle control function requires an initial check of a sensor (for example, a radar) and such an initial check is not complete, the controller 1 may determine that the function cannot be performed.

In S306, the controller 1 performs the instructed vehicle control function. Thereafter, the controller 1 controls the vehicle V in accordance with the vehicle control function. When the vehicle control function ends in response to an instruction from the user or in response to a change in the traveling environment, the controller 1 may perform the method of FIG. 3 again and wait for an instruction to perform the specific vehicle control function. The instructed vehicle control function may use map information provided by the map distribution server 202. The controller 1 may receive the map information from the map distribution server 202 while performing the vehicle control function.

The above-described determination of S302 (that is, it is determined whether the user has the authority to use the instructed vehicle control function) may be performed based on authority information stored in the storage device (for example, the memory of the controller 1) of the vehicle V. The authority information may be information indicating whether the user has an authority to use the specific vehicle control function. In the following description, the authority information stored in the storage device of the vehicle V is referred to as internal authority information. For example, the controller 1 may determine "YES" in S302 when the internal authority information indicates that the user has the use authority, and may determine "NO" in S302 when the internal authority information indicates that the user does not have the use authority. Accordingly, as described above in FIG. 3, the controller 1 may perform the specific vehicle control function based at least in part on the internal authority information indicating that the user has the use authority. Accordingly, even when the controller 1 cannot communicate with the user management server 201 upon receiving the instruction in S301, the controller 1 can perform the specific vehicle control function by satisfying the conditions of S302 to S305.

The controller 1 may update the internal authority information based on the authority information received from the user management server 201. In the following description, the authority information received from the user management server 201 is referred to as external authority information. The external authority information is information indicating whether the user has an authority to use the specific vehicle control function, and may be information managed by the user management server 201. In response to the use authority given to the user in response to a request from the user, the user management server 201 may update the external authority information to indicate that the user has the use authority. In response to a request from the user or in response to an expired expiration date of the use authority, the user management server 201 may cancel the use authority of the user and update the external authority information to indicate that the user does not have the use authority.

An example of a method used for the controller 1 of the vehicle V to manage the internal authority information will be described with reference to FIG. 4. Each step of the method of FIG. 4 may be performed by a processor of the controller 1 executing a program stored in the memory of the controller 1. Instead of this, some or all of the steps of the method of FIG. 4 may be performed by a dedicated integrated circuit such as an ASIC. The method of FIG. 4 may be started in response to turn-on a power source (for example, an ignition power supply) of the vehicle V. Before the method of FIG. 4 starts, an initial value may be set in the internal authority information. The initial value may indicate that the user does not have the use authority.

In step S401, the controller 1 determines whether the external authority information has been received from the user management server 201. When it is determined that the external authority information is received from the user management server 201 ("YES" in S401), the controller 1 moves the process to S402. Otherwise ("NO" in S401), the controller 1 moves the process to S406. The controller 1 may inquire of the user management server 201 about the external authority information at a predetermined timing, and may receive the external authority information as a response to the inquiry. For example, the controller 1 may inquire about the external authority information in response to turn-on of power (for example, an ignition power supply) of the vehicle V, may inquire about the external authority information periodically, or may inquire about the external authority information in response to a predetermined length (for example, 3 days) until the expiration of the expiration date of the use authority.

The user management server 201 may voluntarily transmit the external authority information to the vehicle V (that is, regardless of the inquiry from the vehicle V), and the vehicle V may receive the external authority information. The user management server 201 may periodically transmit the external authority information to the vehicle V, or may transmit the external authority information to the vehicle V in response to update of the external authority information (for example, in response to the giving use authority to the user or in response to cancelation of the use authority of the user).

In step S402, the controller 1 determines whether the external authority information received in step S401 matches the internal authority information. When it is determined that the external authority information matches the internal authority information ("YES" in S402), the controller 1 moves the process to S401. Otherwise ("NO" in S402), the controller 1 moves the process to S403. When the external authority information matches the internal authority information, it is not necessary to update the internal authority information. Therefore, the controller 1 moves the process to S401 and waits for receiving new external authority information.

In step S403, the controller 1 determines whether the external authority information indicates that the user does not have the use authority. When it is determined that the external authority information indicates that the user does not have the use authority ("YES" in S403), the controller 1 moves the process to S404. Otherwise ("NO" in S403), the controller 1 moves the process to S405.

When the external authority information indicates that the user has the use authority and the internal authority information indicates that the user does not have the use authority, the controller updates the internal authority information to indicate that the user has the use authority in S405. The update for giving the use authority may be immediately performed without performing S404.

In S404, the controller 1 determines whether the vehicle Vis traveling. When it is determined that vehicle Vis traveling ("YES" in S404), controller 1 repeats S404. Otherwise ("NO" in S404), the process moves the process to S405. When the vehicle Vis traveling, the controller 1 waits for the transition to S405 until the traveling of the vehicle V ends.

The controller 1 may determine whether the traveling of the vehicle V has ended based on at least one of the speed of the vehicle V becoming zero, the shift position of the vehicle V becoming a parking range, the parking brake of the vehicle V operating, and the power source (for example, an ignition power supply) of the vehicle V being turned off. These conditions may be arbitrarily combined. For example, the controller 1 may determine that the traveling of the vehicle V has ended based on the fact that the shift position of the vehicle V becomes the parking range and the parking brake of the vehicle Vis operated.

When the external authority information indicates that the user does not have the use authority and the internal authority information indicates that the user has the use authority, the controller updates the internal authority information to indicate that the user does not have the use authority in S405. In this way, the controller 1 may wait for the update to cancel the use authority until the traveling of the vehicle V ends. Accordingly, it is possible to inhibit the user from being confused due to the fact that the specific vehicle control function cannot be performed while the vehicle is traveling.

In S406, the controller 1 determines whether a failure to receive the external authority information is caused due to an action of the user. When it is determined that the failure to receive the external authority information is caused by the act of the user ("YES" in S406), the controller 1 moves the process to S404. Otherwise ("NO" in S406), the controller 1 moves the process to S401.

As described above, it is determined based on the internal authority information whether the user has the use authority, and the internal authority information is updated based on the external authority information. Therefore, even when the use authority is cancelled by the user management server 201, the user can continue to use the vehicle control function as long as the controller 1 cannot receive the external authority information. Therefore, in some embodiments, when the failure to receive the external authority information is caused by the action of the user, the controller 1 performs the process after S404. That is, the controller 1 updates the internal authority information to indicate that the user does not have the use authority. Conversely, when the failure to receive the external authority information is not caused due to the action of the user, the controller 1 moves the process to S401 and waits for receiving new external authority information.

The action of the user for making the external authority information unreceivable may include at least one of non-agreement to provision of the personal information to the user management server 201 and the communication device 7c of the vehicle V being out of a communication area. For example, the user management server 201 may provide the external authority information to the vehicle V in response to acquisition of the personal information of the user from the vehicle V. In such a case, when the controller 1 cannot transmit the personal information to the user management server 201, the controller 1 cannot receive the external authority information. Therefore, when a state in which the controller 1 does not agree to provide the personal information to the user management server 201 continues for a predetermined period (for example, one week or one month), the controller 1 may determine "YES" in S406. The personal information transmitted to the user management server 201 may include account information of the user, and identification information (for example, VIN) of the vehicle V.

When the state in which the communication device 7c of the vehicle Vis out of a communication area continues for a predetermined period (for example, one week or one month), the user management server 201 may determine "YES" in S406. Such a situation may occur when the user manually turns off the communication device 7c or continues to use the vehicle V outside of a communication service range.

Figure 4:
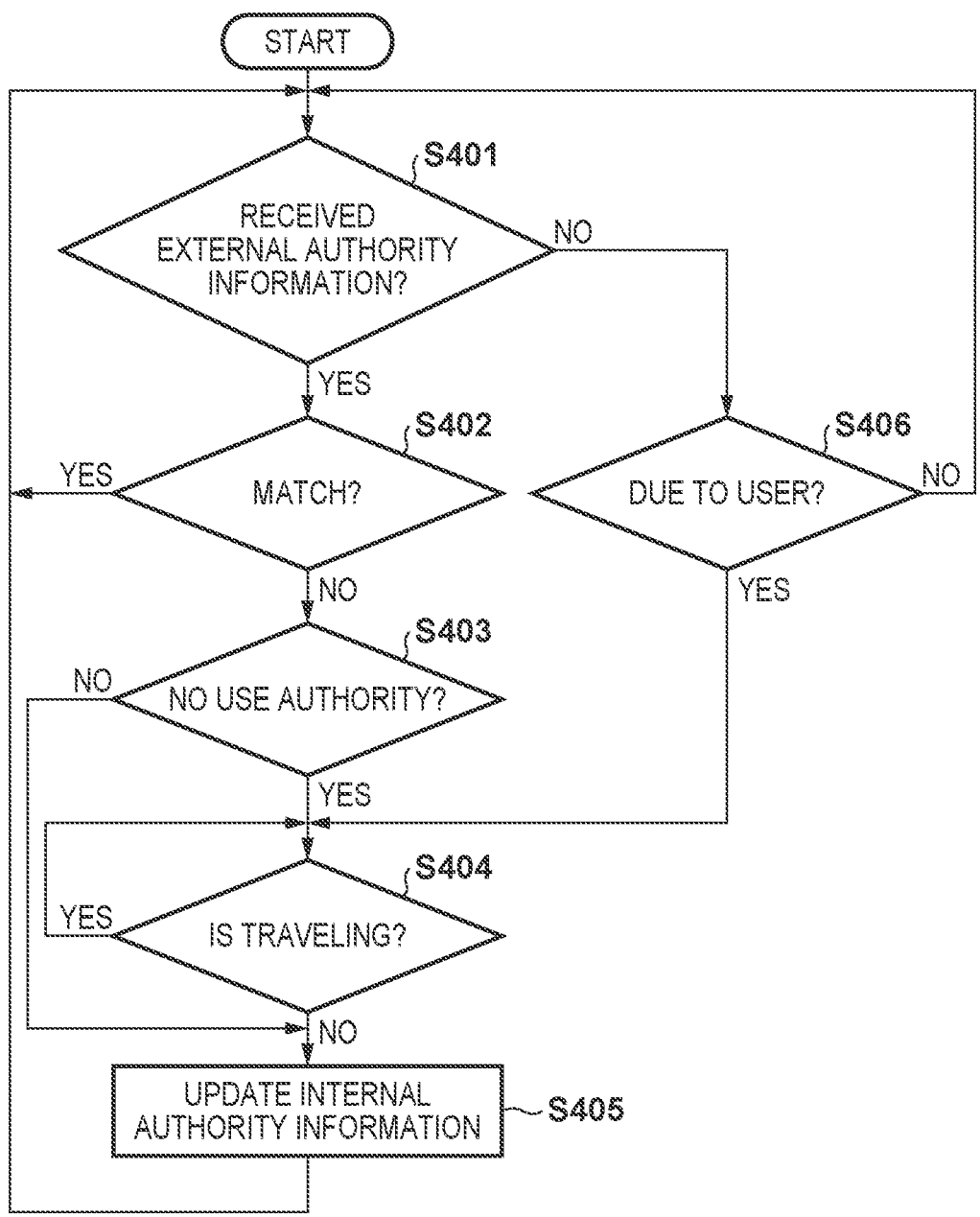
FIG. 4 is a flowchart illustrating an operation example of a vehicle according to some embodiments.

In the above-described method of FIGS. 4, S403 and S404 may be omitted. In this case, when the controller 1 "NO" in S402, the controller 1 may move the process to S405. In the above-described method of FIG. 4, S406 may be omitted. In this case, when the controller 1 "NO" in S401, the controller 1 may repeat S401.

CONCLUSION OF EMBODIMENTS

<Item 1> A control device (1) for a vehicle (V), the control device comprising:
a reception unit (1) configured to receive, from a server (201), first authority information indicating whether a user of the vehicle has an authority to use a specific vehicle control function;
an update unit (1) configured to update, based on the first authority information, second authority information that indicates whether the user has the authority to use the specific vehicle control function and is stored in a storage device of the vehicle; and
a vehicle control unit (1) configured to perform the vehicle control function based at least in part on the second authority information indicating that the user has the authority to use the specific vehicle control function.

According to this item, even when the server cannot be accessed, the vehicle control function can be performed with reference to the authority information stored in the storage device. Therefore, the convenience of the vehicle control function is improved.

<Item 2> The control device according to Item 1, wherein, when the first authority information indicates that the user does not have the authority to use the specific vehicle control function, the update unit waits for updating the second authority information until traveling of the vehicle ends.

According to this item, since the use authority is not canceled during traveling of the vehicle, it is possible to reduce confusion of the user.

<Item 3> The control device according to Item 2, wherein the update unit determines whether the traveling of the vehicle ends based on at least one of a speed of the vehicle becoming zero, a fact that a shift position of the vehicle moving to a parking range, a parking brake of the vehicle being operated, and a power source of the vehicle being turned off.

According to this item, it is possible to appropriately determine the end of traveling of the vehicle.

<Item 4> The control device according to Item 2, wherein the update unit updates the second authority information to indicate that the user does not have the authority to use the specific vehicle control function based on a fact that the first authority information is not receivable from the server due to an action of the user.

According to this item, it is possible to inhibit the use of the vehicle control function by the user who does not have the use authority.

<Item 5> The control device according to Item 4, wherein the action of the user includes at least one of non-agreement to provision of personal information to the server and a communication device of the vehicle being out of a communication area.

According to this item, it is possible to appropriately determine whether the failure to receive the authority information from the server is caused due to the action of the user.

<Item 6> A program for causing a computer to function as the control device according to any one of Items 1-5.

According to this item, a program capable of realizing the control device according to the above-described items is provided.

<Item 7> A method of controlling a vehicle (V), the method comprising:
  receiving (S401), from a server (201), first authority information indicating whether a user of the vehicle has an authority to use a specific vehicle control function;
  updating (S405), based on the first authority information, second authority information that indicates whether the user has the authority to use the specific vehicle control function and is stored in a storage device of the vehicle; and
  performing (S306) the vehicle control function based at least in part on the second authority information indicating that the user has the authority to use the specific vehicle control function.

According to this item, even when the server cannot be accessed, the vehicle control function can be performed with reference to the authority information stored in the storage device. Therefore, the convenience of the vehicle control function is improved.

According to this item, it is possible to efficiently confirm agreement to use the personal information.

The invention is not limited to the foregoing embodiments, and various variations/changes are possible within the spirit of the invention.

What is claimed is:

1. A control device for a vehicle, the control device comprising:
  a reception unit configured to receive, from a server, first authority information indicating whether a user of the vehicle has an authority to use a specific vehicle control function;
  an update unit configured to update, based on the first authority information, second authority information that indicates whether the user has the authority to use the specific vehicle control function and is stored in a storage device of the vehicle; and
  a vehicle control unit configured to perform the vehicle control function based at least in part on the second authority information indicating that the user has the authority to use the specific vehicle control function,
  wherein, when the first authority information indicates that the user does not have the authority to use the specific vehicle control function, the update unit waits for updating the second authority information until traveling of the vehicle ends.

2. The control device according to claim 1, wherein the update unit determines whether the traveling of the vehicle ends based on at least one of a speed of the vehicle becoming zero, a fact that a shift position of the vehicle moving to a parking range, a parking brake of the vehicle being operated, and a power source of the vehicle being turned off.

3. The control device according to claim 1, wherein the update unit updates the second authority information to indicate that the user does not have the authority to use the specific vehicle control function based on a fact that the first authority information is not receivable from the server due to an action of the user.

4. The control device according to claim 3, wherein the action of the user includes at least one of non-agreement to provision of personal information to the server and a communication device of the vehicle being out of a communication area.

5. A non-transitory storage medium storing a program for causing a computer to function as the control device according to claim 1.

6. A method of controlling a vehicle, the method comprising:
  receiving, from a server, first authority information indicating whether a user of the vehicle has an authority to use a specific vehicle control function;
  updating, based on the first authority information, second authority information that indicates whether the user has the authority to use the specific vehicle control function and is stored in a storage device of the vehicle;
  performing the vehicle control function based at least in part on the second authority information indicating that the user has the authority to use the specific vehicle control function; and
  when the first authority information indicates that the user does not have the authority to use the specific vehicle control function, waiting for updating the second authority information until traveling of the vehicle ends.

* * * * *